April 21, 1959

F. B. SHAW 2,882,890

OVEN LINER

Filed July 3, 1953

INVENTOR
*Francis B Shaw*

BY *N F Presson*

ATTORNEY

April 21, 1959      F. B. SHAW      2,882,890
OVEN LINER
Filed July 3, 1953      2 Sheets-Sheet 2
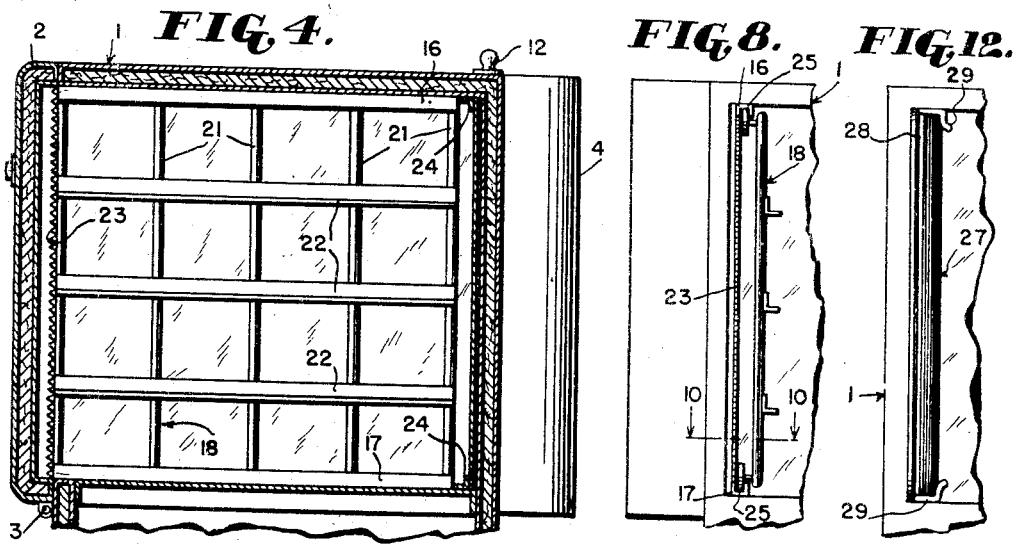
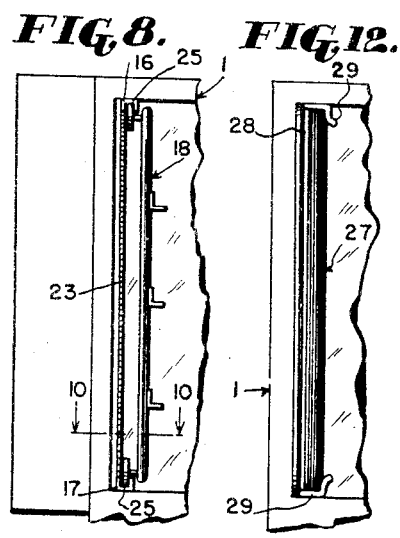
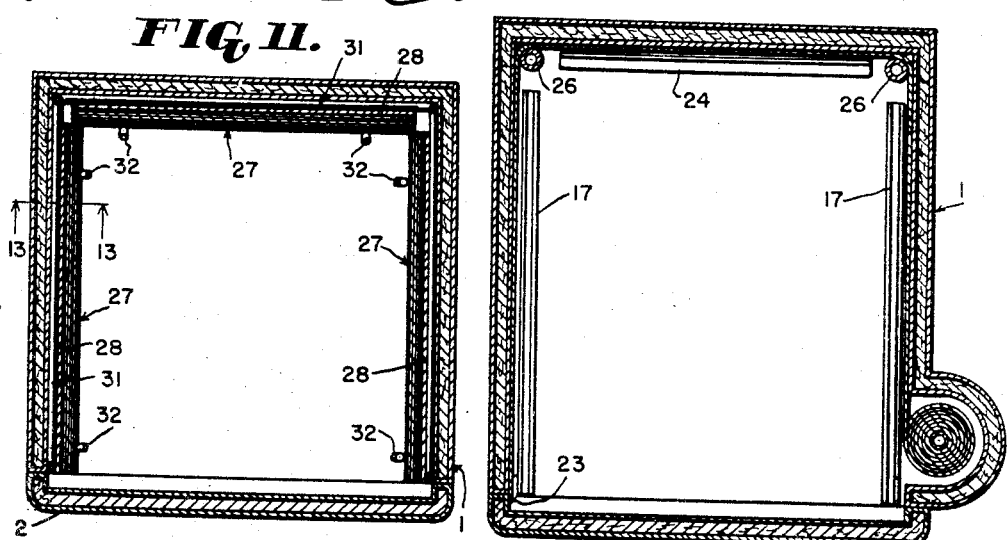
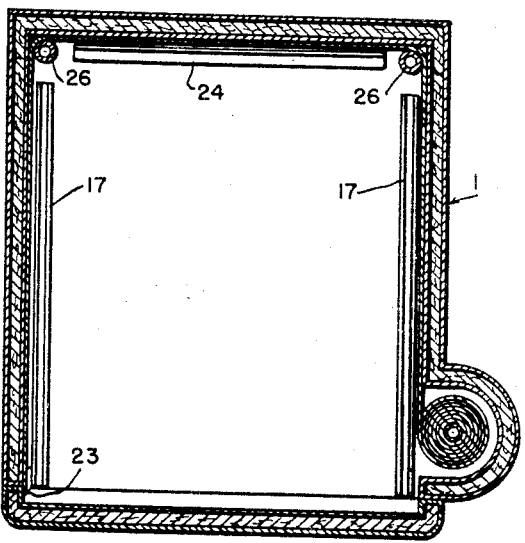
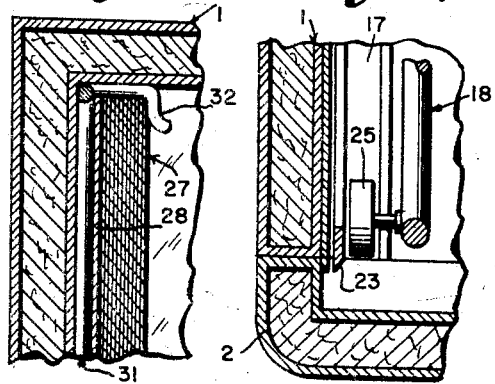
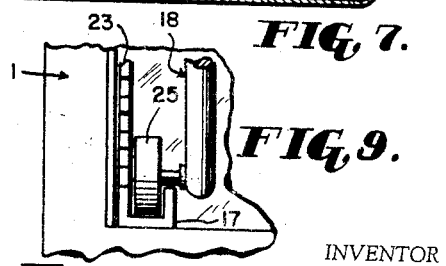
INVENTOR
*Francis B. Shaw*
BY
ATTORNEY

United States Patent Office 2,882,890
Patented Apr. 21, 1959

2,882,890

OVEN LINER

Francis B. Shaw, Washington, D.C.

Application July 3, 1953, Serial No. 365,990

7 Claims. (Cl. 126—273)

This invention relates generally to liners for ovens of the type employed for cooking food and more particularly to a disposable liner composed of thin foil which is expendable and readily removable from the oven when desired.

When broiling meat, fish, fowl and the like by heat derived from a heating unit of a cooking range, quantities of juices and fats are driven off the food material and deposited on the sides of the broiling oven compartment. Such juice and grease deposits are frequently carbonized and firmly adhere to the oven walls by reason of the relatively high temperatures usually employed for the broiling operation. The removal of such deposits of grease and carbonized materials from the oven surfaces heretofore has been a tedious and troublesome operation. Failure to remove such grease deposits within a reasonable time after each broiling may cause the grease to become rancid.

It is an object of the present invention to provide a new and improved oven liner which will minimize the amount of cleaning of the oven walls after each broiling operation.

Another object is to provide an oven reliner in which desired lengths of thin flexible foil may be withdrawn from a supply roll and discarded after use.

Another object is the provision of a plurality of rolls of thin foil and means associated therewith for maintaining a predetermined length of foil unrolled therefrom in contiguous relation to the walls of the oven.

Still another object is the provision of new and improved means for quickly replacing an oven wall surface which has become soiled as the result of a broiling operation.

Still other objects, advantages and improvements will be apparent from the following description taken in connection with the accompanying drawings of which:

Fig. 4 is a view taken along line 4—4 of Fig. 1;

Fig. 7 is a sectional plan view of an alternative form of the invention;

Fig. 8 is a fragmentary elevational view of an alternative arrangement for supporting the rack;

Fig. 9 is a fragmentary elevational view somewhat enlarged of a roller and track for the support of Fig. 8;

Fig. 10 is an enlarged sectional view taken on line 10—10 of Fig. 8;

Fig. 11 is a sectional plan view of another alternative form of the invention;

Fig. 12 is an elevational view of one pad and supporting means therefor;

Fig. 13 is an enlarged sectional view on line 13—13 of Fig. 11; and

Figure 1:
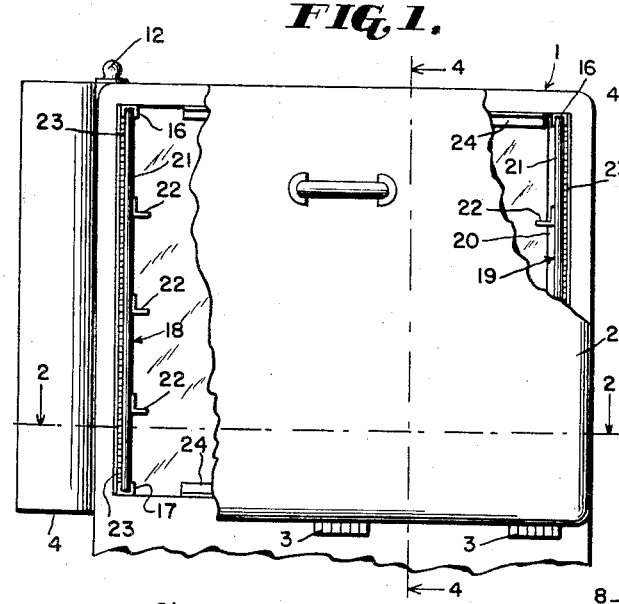
Fig. 1 is a view in elevation and partially broken away of an oven employing my invention in accordance with a preferred form thereof.
Figure 3:
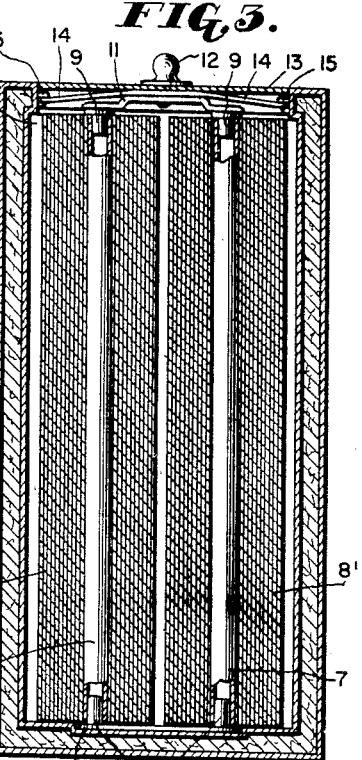
Fig. 3 is an enlarged view taken along line 3—3 of Fig. 2.
Figure 2:
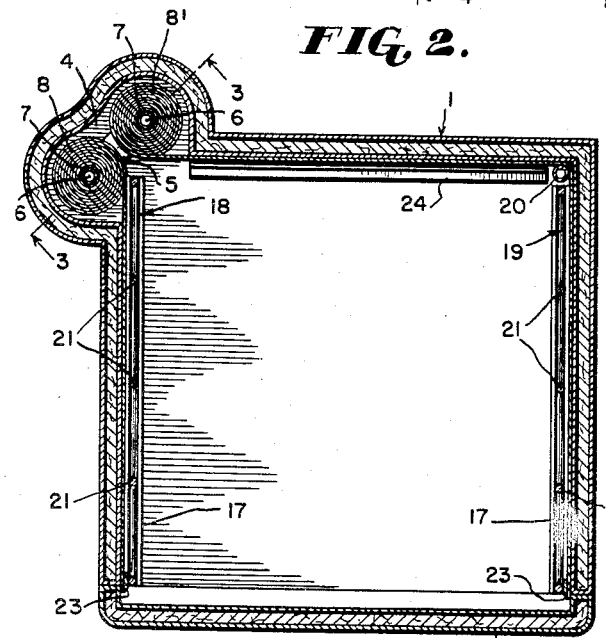
Fig. 2 is a view taken along line 2—2 of Fig. 1.
Figures 5, 6:
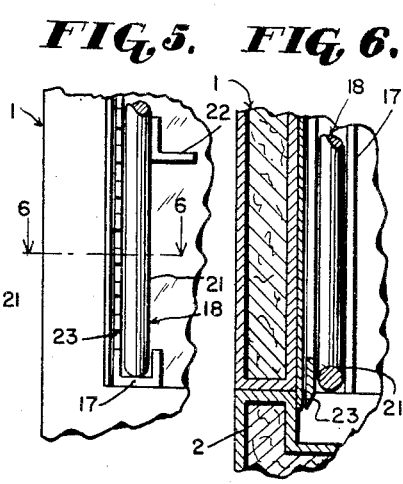
Fig. 5 is a fragmentary enlarged view of a portion of the device of Fig. 1.
Fig. 6 is a sectional view taken on line 6—6 of Fig. 5.
Figure 14:
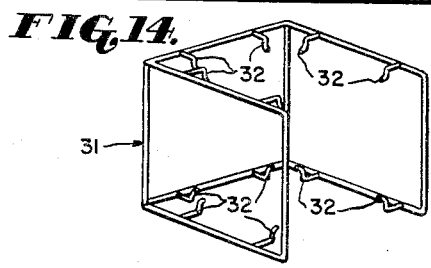
Fig. 14 is a view in perspective of the rack of Fig. 11.

Referring now to the drawings for a more complete understanding of the invention on which like numerals of reference are employed to designate like parts throughout the several views and more particularly to Figs. 1 to 3 thereof, there is shown thereon an oven generally designated by the numeral 1 having a door 2 hinged thereto as at 3. The oven is recessed at 4 and provided with a member 5 having a pair of upstanding bearing supports 6 secured thereto adapted to receive the tubular cores 7 of a pair of rolls 8—8' of thin metal foil such as aluminum or aluminum alloy wrapped thereabout in such fashion as to permit the rolls to rotate as a length of foil is withdrawn therefrom. The upper ends of the cores 7 are pivotally supported by the bearing members 9 secured to a member 11 by the knob and spindle 12. The knob 12 is secured to a cover 13 constructed and arranged to enclose the recessed portion 4, the knob being releasably secured thereto by the spring arms 14 as these arms are moved into locking engagement with a pair of detents 15 as illustrated in Fig. 3.

The spring arms 14 are also preferably employed to maintain sufficient pressure on the cores 7 to maintain the foil taut as it is drawn from the rolls. Alternatively, a slight braking action on the rolls may be obtained by a spring arrangement applied to the lower bearing supports 5 whereby these bearing supports would be urged upwardly, in which case the bearing supports preferably would be provided with a collar similar to the collar illustrated on the supports 9. Or, if desired, a slight tension in the foil may be obtained during the withdrawing operation by light flexible strips of metal pressing thereagainst at or near the roll.

Secured to the bottom and top inner surfaces of the oven respectively are the pairs of channel members 16—16 and 17—17 for slidably receiving and supporting a pair of racks 18—19 in close spaced adjacency to the left and right walls, Fig. 1, of the oven respectively. Each of the racks comprises a plurality of rods 21 to which are secured the angle members 22 employed for supporting the conventional oven shelves or trays (not shown). The racks 18—19 are also employed for retaining a length of foil from each of the rolls 8—8' in a vertical position against the left and right walls of the oven respectively, the foil from roll 8' additionally passing over a roller 20 in the manner illustrated. There is also secured preferably to the channel members 16—17 a pair of serrated cutting strips 23 by means of which a soiled length of foil from the rolls 8—8' may be quickly severed and detached at will for disposal. A pair of guide members 24 secured to the top and bottom inner walls of the oven respectively are employed for guiding and supporting the foil from roller 8' against the rear wall of the oven. The terms top, bottom, right, left, upper and lower as employed herein are to be construed as applying to the structure as viewed in Fig. 1 of the drawings.

In operation when it is desired to clean the oven it is merely necessary to open the oven door, withdraw the soiled lengths of foil and tear them off by pulling them against the serrated strips 23. As the soiled lengths of foil are pulled out, sufficient lengths of foil are withdrawn from the rolls to thereby line the inner walls of the oven with clean fresh foil.

In Fig. 7 is shown a sectional plan view of an alternative form of the invention in which the pair of rolls of foil of Fig. 1 are replaced by a single roll of foil disposed within a recess within a side wall near the oven door. The foil from the roll is moved along three walls of the oven and past the pair of rollers 26 as illustrated. In this arrangement obviously only one serrated tear strip 23 is required.

In Figs. 8-10 is shown an alternative arrangement for moveably supporting the racks 18—19 within the oven. The rack 18, for example, may be provided with rollers 25 at the upper and lower portions thereof engaged by the channel members 16—17 for facilitating reciprocal movement of the racks when it is desired to place a new roll of foil in operative position within the oven.

On Figs. 11–14 is shown the invention according to another form thereof in which the foil is arranged in layers and preferably provided with a reinforced edge to form a pad or tablet generally indicated by the numeral 27 and having a back portion 28 of greater stiffness than the foil. These pads may be slipped into position and retained by clips 29 secured to the oven walls as illustrated on Fig. 12, or alternatively may be supported by the rack 31, or retained by the clips 32 thereon. The rack 31 bearing the pads of foil may be slid into position within the oven. The removal of the soiled top layer of foil from each of the pads exposes a clean fresh surface at the oven walls.

The term foil as employed herein is intended to cover a range of alloys resistant to the temperatures employed in broiling food materials.

If desired, the present invention could also be advantageously applied to the oven door.

Whereas the invention has been described with reference to several examples which give satisfactory results, it is not so limited as it will be apparent to those skilled in the art to which the invention pertains, after understanding the invention, that various changes and modifications may be made without departing from the spirit and scope of the invention and it is my intention, therefore, in the appended claims to cover all such changes and modifications.

What I claim as new and desire to be secured by Letters Patent of the United States is:

1. In combination with an oven having a back wall and side walls, a vertically disposed recess in communication with the interior of the oven and having an opening in the upper end thereof, an oven liner comprising a copious supply of thin aluminum foil arranged within said recess sufficient to cover said back and side walls repeatedly, means for supporting a fractional portion of said foil in vertical planes contiguous with said back and side walls respectively, a cover for said recess, and means carried by the oven and immovable with respect thereto for serving a length of said foil soiled by a broiling operation after said length of foil has been withdrawn from the oven.

2. In combination with an oven having a back wall and side walls, a vertically disposed recess in communication with the interior of the oven and having an opening in the upper end thereof, a liner comprising a copious supply of thin aluminum foil arranged within said recess sufficient to cover said back and side walls repeatedly, a cover for said recess, means for detachably supporting a fractional portion of said foil in an exposed position in proximate spaced relation to said back and side walls for grease deposit on an outer surface thereof during a broiling operation, said fractional portion being just sufficient in area to cover and protect said back and side walls from said grease deposit, and means carried by the oven and immovable with respect thereto for severing a length of said foil soiled by a broiling operation after said length of foil has been withdrawn from the oven.

3. In combination with a cooking oven having a back wall and a pair of side walls, a vertically disposed recess in communication with the interior of the oven and having an opening in the upper end thereof, an oven liner comprising a copious roll of thin foil arranged within said recess with the axis vertical, a cover for said recess having means for providing a pivotal connection to said roll, means including a pair of rack members and a pair of guide members for guiding and maintaining a length of foil withdrawn from the roll in abutting relation to said walls, said rack members being disposed vertically in closely spaced adjacency to said side walls respectively and said guide members being disposed in closely spaced adjacency to said back wall, resilient brake means carried by said cover and operatively connected to said roll for maintaining tension in said length of foil as the foil is withdrawn, and means carried by the oven and immovable with respect thereto for severing a length of foil soiled by a broiling operation and corresponding to the combined lengths of said walls after said length of foil has been withdrawn from the oven.

4. In combination with a cooking oven having a back wall and a pair of side walls, a vertically disposed recess in communication with the interior of the oven and having an opening in the upper end thereof, a copious roll of thin foil arranged within said recess with the axis vertical, a cover for said recess having means for providing a pivotal connection to said roll, a pair of racks slideably carried by said oven for guiding a length of foil withdrawn from said roll against said side walls respectively, means including a pair of elongated guide members carried by the upper and lower surface portions of the oven for guiding and maintaining the foil from said roll in abutting relation to said back wall, a braking element carried by said cover and operatively connected to said roll for maintaining tension in said length of foil as the foil is withdrawn, and a serrated bar immovably secured to the oven for cutting a desired length of foil withdrawn past said racks.

5. The combination according to claim 4 including a pair of vertically disposed rollers respectively mounted for pivotal movement between each of said racks and said elongated guide members about which the foil is arranged.

6. In combination with a cooking oven having a back wall and a pair of side walls, a vertically disposed recess in communication with the interior of the oven and having an opening in the upper end thereof, at least one roll vertically disposed for pivotal movement within said recess and having a copious supply of thin aluminum foil thereon, a cover for said recess having means for providing a pivotal connection to said roll, means including a pair of elongated guide members carried by the upper and lower surface portions of the oven respectively and a pair of racks arranged for reciprocal movement adjacent to and parallel with said side walls for maintaining a length of said foil in substantial abutting relation to each of said walls, means immovably carried by the oven for severing said foil at will when a desired length has been withdrawn past said racks, and means carried by said cover and comprising a brake element operatively connected to said roll for maintaining the foil under tension as the foil is withdrawn.

7. The combination of claim 6 including roller means secured to each of said racks for facilitating the movement thereof.

References Cited in the file of this patent

UNITED STATES PATENTS

| | | |
|---|---|---|
| 144,342 | Marchand | Nov. 4, 1873 |
| 515,141 | Brandeberry | Feb. 20, 1894 |
| 1,121,299 | Sharrock | Dec. 15, 1914 |
| 1,363,085 | Carlson | Dec. 21, 1920 |
| 1,435,685 | Bangen | Nov. 14, 1922 |
| 1,803,617 | Hummel | May 5, 1931 |
| 1,836,888 | Wilkinson | Dec. 15, 1931 |
| 2,236,992 | Broadley | Apr. 1, 1941 |
| 2,271,099 | Schur | Jan. 27, 1942 |
| 2,466,859 | Northrup | Apr. 12, 1949 |
| 2,503,771 | Roll | Apr. 11, 1950 |
| 2,555,416 | Marano | June 5, 1951 |
| 2,703,078 | Hammond | Mar. 1, 1955 |
| 2,742,559 | Edelman | Apr. 17, 1956 |
| 2,746,448 | Holmsten | May 22, 1956 |
| 2,803,242 | Hammond | Aug. 20, 1957 |